(12) United States Patent
Lee

(10) Patent No.: US 12,437,457 B2
(45) Date of Patent: Oct. 7, 2025

(54) APPARATUS AND METHOD FOR GENERATING DANCING AVATAR

(71) Applicant: UIF (University Industry Foundation), Yonsei University, Seoul (KR)

(72) Inventor: Sang Hoon Lee, Seoul (KR)

(73) Assignee: UIF (University Industry Foundation, Yonsei University, Seoul (KR)

( * ) Notice: Subject to any disclaimer, the term of this patent is extended or adjusted under 35 U.S.C. 154(b) by 230 days.

(21) Appl. No.: 18/312,149

(22) Filed: May 4, 2023

(65) Prior Publication Data
US 2024/0161378 A1    May 16, 2024

(30) Foreign Application Priority Data
May 9, 2022   (KR) .................. 10-2022-0056684

(51) Int. Cl.
*G06T 13/40*    (2011.01)
(52) U.S. Cl.
CPC .................... *G06T 13/40* (2013.01)
(58) Field of Classification Search
CPC ......... G06T 13/40; G06T 13/205; G06T 7/20; G06F 16/65
See application file for complete search history.

(56) References Cited

U.S. PATENT DOCUMENTS 7,297,860 B2 * 11/2007 Decuir ............... G06Q 30/0601
                                                        84/645
11,816,773 B2 * 11/2023 Krishnan Gorumkonda ...............
                                                      G06N 3/045
(Continued)

FOREIGN PATENT DOCUMENTS

| CN | 111986295 A | * | 11/2020 | ............ A63F 13/60 |
| CN | 112330779 A | * | 2/2021 | |
| KR | 10-1270151 B1 | | 5/2013 | |

OTHER PUBLICATIONS

Ferreira, J. P., Coutinho, T. M., Gomes, T. L., Neto, J. F., Azevedo, R., Martins, R., & Nascimento, E. R. (2021). Learning to dance: A graph convolutional adversarial network to generate realistic dance motions from audio. Computers & Graphics, 94, 11-21. (Year: 2021).*

(Continued)

*Primary Examiner* — Daniel F Hajnik
*Assistant Examiner* — Adeel Bashir

(57) ABSTRACT

The present disclosure provides an apparatus and method for generating a dancing avatar, that receives a latent code and map it using a neural network operation to obtain a plurality of genre-specific style codes for each of a plurality of dance genres, and decodes seed motion data and music data, which are motion data that must be referred to when generating an avatar's dance motion, using a genre-specific style code for a dance genre selected among the plurality of genre-specific style codes as a guide, thereby obtaining a dance vector representing a dance motion feature of the avatar in the selected dance genre. According to the present disclosure, it is possible to continuously generate various dance motions of the avatar in relation to previous dance motions, and freely change the dance genre according to user commands or music.

16 Claims, 8 Drawing Sheets

(56) References Cited

U.S. PATENT DOCUMENTS

2012/0139830 A1* 6/2012 Hwang .................. G06V 40/16
345/156
2018/0214777 A1* 8/2018 Hingorani ........... A63F 13/5255

OTHER PUBLICATIONS

Zhang, X., Xu, Y., Yang, S., Gao, L., & Sun, H. (2021). Dance generation with style embedding: Learning and transferring latent representations of dance styles. arXiv preprint arXiv:2104.14802. (Year: 2021).*

Li, R., Yang, S., Ross, D. A., & Kanazawa, A. (2021). Ai choreographer: Music conditioned 3d dance generation with aist++. In Proceedings of the IEEE/CVF international conference on computer vision (pp. 13401-13412). (Year: 2021).*

Aberman, K., Weng, Y., Lischinski, D., Cohen-Or, D., & Chen, B. (2020). Unpaired motion style transfer from video to animation. ACM Transactions on Graphics (TOG), 39(4), 64-1. (Year: 2020).*

Guo, X., Zhao, Y., & Li, J. (2021). Dancelt: music-inspired dancing video synthesis. IEEE Transactions on Image Processing, 30, 5559-5572. (Year: 2021).*

Yuhang Huang et al., "Genre-Conditioned Long-Term 3D Dance Generation Driven by Music," 2022 IEEE International Conference on Acoustics, Speech and Signal Processing, [Date Added to IEEE Xplore Apr. 27, 2022].

Soomin Park et al., "Diverse Motion Stylization for Multiple Style Domains via Spatial-Temporal Graph-Based Generative Model", Proceedings of the ACM on Computer Graphics and Interactive Techniques col. 4, Issue 3, [Sep. 27, 2021].

Ruilong Li et al., "AI Choreographer: Music Conditioned 3D Dance Generation with AIST++", Proceedings of the IEEE/CVF International Conference on Computer Vision, [Oct. 17, 2021].

* cited by examiner

APPARATUS AND METHOD FOR GENERATING DANCING AVATAR

CROSS-REFERENCE TO RELATED APPLICATIONS

This application claims priority under 35 U.S.C. § 119(a) to Korean Patent Application No. 10-2022-0056684, filed on May 9, 2022, with the Korean Intellectual Property Office, the disclosure of which is incorporated herein in its entirety by reference.

BACKGROUND

1. Technical Field

The disclosed embodiments relate to an apparatus and method for generating an avatar, and more particularly to an apparatus and method for generating a dancing avatar that can perform various genres of dance while modifying it according to music.

2. Description of the Related Art

An avatar refers to a graphic icon that represents a user on behalf of the user in various online environments. Avatars are used in a variety of ways on various platforms due to their advantage of not only being able to simply represent the user's identity, which is difficult to express through text alone, but also expressing the user's current mood or various states.

Conventional avatars often expressed only part of the body shape, such as the face or upper body, and even when the entire body appeared, it was possible to express several specified facial expressions or actions. Also conventionally, the activity area of avatars on online platforms was not large, so most were static avatars that only performed facial expressions or actions when the user specified them.

However, recently, not only has the activity area of avatars expanded in online platforms such as the metaverse, various games, and VR, but the environment has changed to 3D, and due to the development of artificial intelligence, various actions can be taken even without direct commands from the user. In particular, most platforms provide multimedia such as music, and accordingly, some platforms allow avatars to dance to music. The various actions of the avatar itself make the virtual environment on each platform appear more dynamic and rich.

However, currently, dancing avatars show a pattern of simply repeating a designated dance motion. Therefore, although it shows a more active pattern than a static avatar, there is a limitation in that users who watch the avatar for a long time may easily become bored and no longer have interest in the virtual environment.

SUMMARY OF THE INVENTION

An object of the present disclosure is to provide an apparatus and method for generating a dancing avatar for generating an avatar that can perform various dance motions.

Another object of the present disclosure is to provide an apparatus and method for generating a dancing avatar that can vary the dance motion of the avatar while changing the dance genre according to a user command.

An apparatus for generating a dancing avatar according to an embodiment of the present disclosure, conceived to achieve the objectives above, comprises: one or more processors; and a memory that stores one or more programs executed by the one or more processors, wherein the processors receive a latent code and map it using a neural network operation to obtain a plurality of genre-specific style codes for each of a plurality of dance genres, and decodes seed motion data and music data, which are motion data that must be referred to when generating an avatar's dance motion, using a genre-specific style code for a dance genre selected among the plurality of genre-specific style codes as a guide, thereby obtaining a dance vector representing a dance motion feature of the avatar in the selected dance genre.

The processors may obtain the plurality of genre-specific style codes by mapping the latent code to each area divided according to each of a plurality of dance genres in a virtual style space.

The processors may randomly and repeatedly generate the latent code.

The processors may select one dance genre from the plurality of dance genres in response to a user command.

The processors may project each of the seed motion data and the music data into a virtual common feature vector space to obtain a motion vector and a music vector, and decode the obtained motion vector and the music vector using a transformer decoder so that the feature designated by the selected genre-specific style code stand out, thereby obtaining the dance vector.

The processors may receive the dance vector, convert it into a format of the motion data to obtain dance data, and apply an avatar skin to the obtained dance data, thereby generating a dancing avatar.

The processors may obtain previously obtained dance data as the seed motion data.

The processors may obtain a random value, capture data obtained by capturing user's motions, and 3D dance motion data extracted from a 2D or 3D dance video as an initial value of the seed motion data.

During training, the processors may receive the dance data and the music data and project them into a virtual common feature vector space to obtain a motion vector and a music vector, obtain a feature map by transformer encoding the motion vector and the music vector using a neural network operation, determine the dance genre of the dance data from a genre score obtained by pooling the feature map, and calculate a loss according to the difference between the determined dance genre and the selected dance genre.

The processors may calculate a style focus loss according to the difference between the dance genre of the seed motion data and the determined dance genre, and when the dance genre of the seed motion data and the selected dance genre are the same, a dance genre-specific loss calculated as the difference between the seed motion data and the dance data, and a style diversity loss that maximizes the difference between dance data by obtaining dance data previously obtained from the same selected dance genre as the seed motion data, so that repeatedly generated dance data represents various motions, and further apply them to the loss.

A method for generating a dancing avatar according to an embodiment of the present disclosure, performed by a computing device having one or more processors and a memory storing one or more programs executed by the one or more processors, comprises the steps of: receiving a latent code and mapping it using a neural network operation to obtain a plurality of genre-specific style codes for each of a plurality of dance genres; and decoding seed motion data and music data that must be referred to when generating an avatar's dance motion, using a genre-specific style code for a dance genre selected among the plurality of genre-specific style codes as a guide, thereby obtaining a dance vector representing a dance motion feature of the avatar in the selected dance genre.

Accordingly, the apparatus and method for generating a dancing avatar according to an embodiment can continuously generate various dance motions of the avatar in relation to previous dance motions, and can freely change the dance genre according to user commands or music, allowing the user to attract interest in the avatar in the virtual environment.

DETAILED DESCRIPTION OF THE INVENTION

Hereinafter, exemplary embodiments of the present disclosure will be described in detail with reference to the drawings. The following detailed description is provided to help comprehensive understanding of a method, an apparatus, and/or a system disclosed herein. However, this is merely exemplary, and the present disclosure is not limited thereto.

While describing the present disclosure, when it is determined that a detailed description of a known art related to the present disclosure may unnecessarily obscure the gist of the present disclosure, the detailed description will be omitted. Terms which will be used below are defined in consideration of functionality in the present disclosure, which may vary according to an intention of a user or an operator or a usual practice. Therefore, definitions thereof should be made on the basis of the overall contents of this specification. Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," and "including," when used herein, specify the presence of stated features, numerals, steps, operations, elements, or combinations thereof, but do not preclude the presence or addition of one or more other features, numerals, steps, operations, elements, or combinations thereof. Also, terms such as "unit", "device", "module", "block", and the like described in the specification refer to units for processing at least one function or operation, which may be implemented by hardware, software, or a combination of hardware and software.

Figure 1:
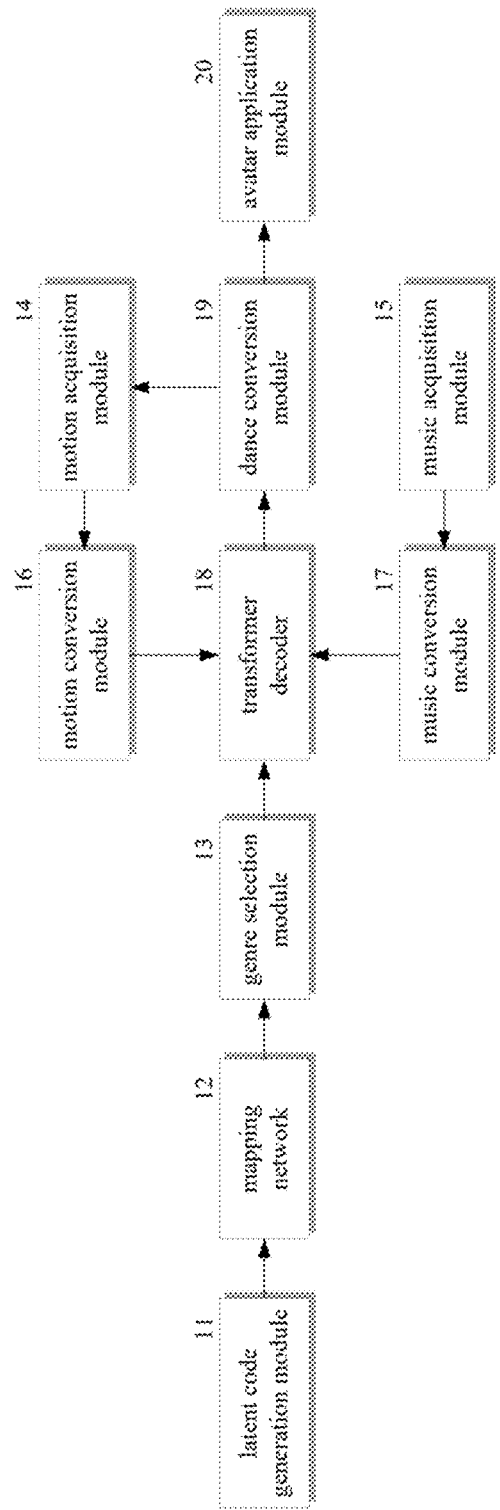
FIG. 1 shows components divided according to operations performed in an apparatus for generating a dancing avatar according to an embodiment.
Figure 2:
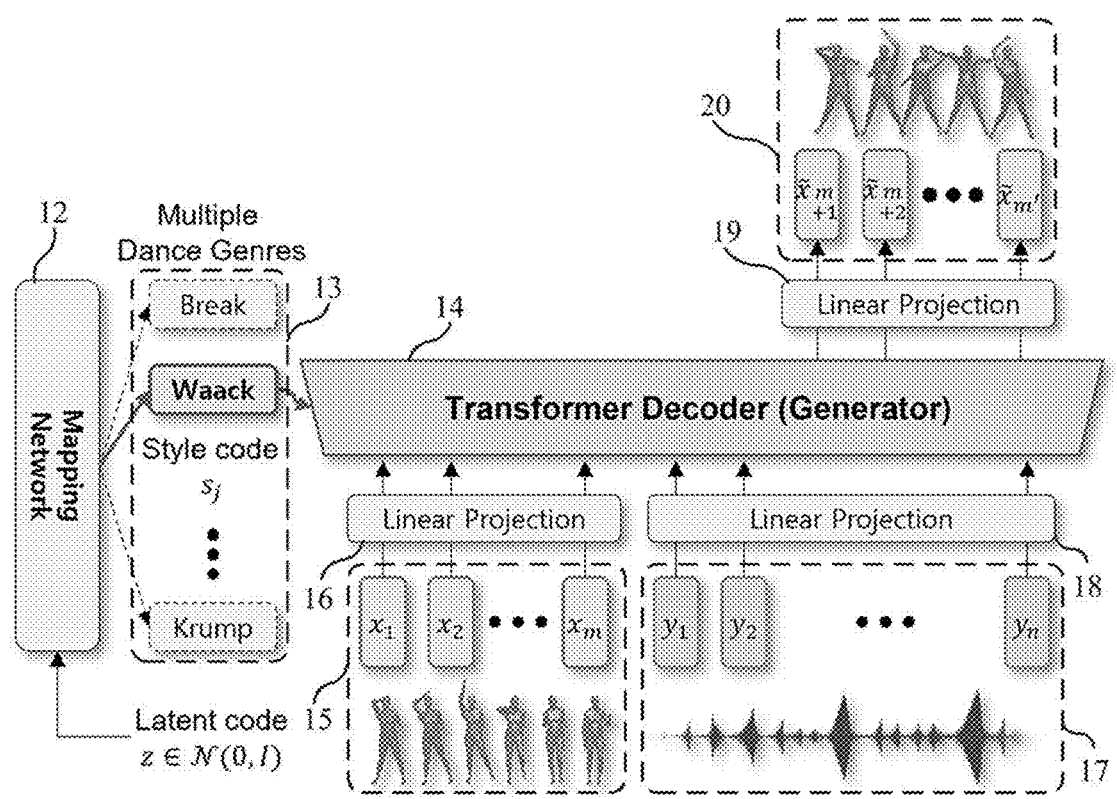
FIG. 2 is a diagram for explaining the operation of each component of the apparatus for generating a dancing avatar of FIG. 1.

FIG. 1 shows components divided according to operations performed in an apparatus for generating a dancing avatar according to an embodiment, and FIG. 2 is a diagram for explaining the operation of each component of the apparatus for generating a dancing avatar of FIG. 1.

Referring to FIGS. 1 and 2, the apparatus for generating a dancing avatar according to the embodiment may include a style code generation module, an input module, a transformer decoder 18, and an output module.

The style code generation module generates a style code to enable the dancing avatar to be generated to perform various dance motions according to the dance genre. When a dance genre is selected, the style code generation module generates a variable style code so that the dance motion of the dancing avatar can continuously change into different motions even within the selected genre.

Specifically, the dance code generation module may include a latent code generation module 11, a mapping network 12, and a genre selection module 13. The latent code generation module 11 generates a latent code (also called latent variable, latent vector) z to generate continuously changing dance motions. The latent code z is a variable obtained to generate various dance motions, and the latent code generation module 11 may repeatedly generate the latent code z periodically or aperiodically.

The latent code generation module 11 can generate the latent code z in various known ways, but here, it is assumed that it is generated as a random code vector based on Gaussian noise distribution. As an example, the latent code z can be generated as a 512-dimensional vector according to a Gaussian noise distribution ($z \in N(0,1)$) with a mean of 0 and a variance of 1.

The mapping network 12 receives a latent code z, performs a neural network operation, maps the latent code z to a style space differently depending on the dance genre, thereby generating the style code ($s = \{s_1, s_2, \ldots, s_J\}$). In other words, even if a single latent code z is applied, the mapping network can map the latent code z to different areas of the style space according to each of a plurality of (here J) designated dance genres, thereby generating a plurality of genre-specific style codes ($s_1, s_2, \ldots, s_J$) with different values for each dance genre. As an example, if 10 dance genres (J=10) are specified, the mapping network can generate 10 different genre-specific style codes ($s = \{s_1, s_2, \ldots, s_{10}\}$) for one input latent code z. Each genre-specific style code ($s_j$) is also generated in vector format, and for example, it can be generated as a vector with the same 512 dimensions as the latent code z. Here, the trained mapping network 12 can generate genre-specific style codes ($s_j$) with different values by mapping the latent code z to be concentrated and distributed in areas divided according to genre in a virtual style space. Then, the plurality of genre-specific style codes ($s_1, s_2, \ldots, s_J$) generated for each genre are transmitted to the genre selection module 13.

The mapping network 12 may be implemented with a trained artificial neural network, for example, with a multilayer perceptron (MLP).

The genre selection module 13 receives genre-specific style codes ($s_1, s_2, \ldots, s_J$) for each of a plurality of dance genres, selects one of the plurality of dance genres (here, j as an example), and transmits the genre-specific style code ($s_j$) for the selected dance genre to the transformer decoder 18. As shown in FIG. 2, the genre selection module 13 can select one of various dance genres such as break, waack, krump, etc., and transmits the style code ($s_j$) specified for the selected dance genre to the transformer decoder 18.

For example, the genre selection module 13 may select a dance genre in response to a user command. When the genre selection module 13 selects a dance genre in response to a user command, the user can change the dance genre in real time according to the user's mood or atmosphere. In other words, the genre-specific style code ($s_j$) can change and have various values regardless of the music data (y) or the previous avatar's dance motion.

However, in some cases, the genre selection module 13 may adaptively select a dance genre according to music data (y) input to the apparatus for generating a dancing avatar. When the dance genre is adaptively selected according to the music data (y), the genre selection module 13 can estimate and select the dance genre most suitable for the current music data (y) without user intervention. In this case, the genre selection module 13 may be implemented with a pre-trained artificial neural network, receive music data (y) acquired by the dance acquisition module 15 of an input module, which will be described later, and perform a neural network operation on the received music data (y) to estimate a dance genre suitable for the music data (y). In addition, the genre selection module 13 may be configured to adaptively select a dance genre according to the music data (y), with the proviso that when the dance genre selection command is applied by a user command, to select a dance genre according to the applied dance genre selection command. It may also be configured to periodically and randomly select a dance genre.

Here, since the genre-specific style code ($s_j$) is a code generated by mapping the variable latent code z to the style space, even if a specific dance genre (for example, j) is selected and maintained, if the latent code z changes, the value of the genre-specific style code ($s_j$) also changes. Conversely, even if the value of the latent code z does not change, the genre-specific style code ($s_j$) for each dance genre has different values, so when the selected dance genre changes (j→i), a different value of the genre-specific style code ($s_i$) may be selected.

The input module acquires music data (y={$y_1, y_2, \ldots, y_m$}) and seed motion data (x={$x_1, x_2, \ldots, x_m$}), converts each of the acquired music data (y) and seed motion data (x), and inputs them to the transformer decoder 18.

The input module includes a motion acquisition module 14, a music acquisition module 15, a motion conversion module 16, and a music conversion module 17. The motion acquisition module 14 acquires seed motion data (x) to be referenced when the apparatus for generating a dancing avatar generates a dance motion to be performed by the avatar. In this embodiment, the apparatus for generating a dancing avatar can repeatedly generate various dance motions. Here, the same dance motion should not be generated repeatedly, but if the difference between the generated dance motions is large, this may also cause the avatar to perform very awkward dance motions, causing discomfort to the user. Therefore, the apparatus for generating a dancing avatar must be able to generate a dance motion of the avatar that can naturally continue from a dance motion previously performed by the avatar. Accordingly, in the embodiment, the motion acquisition module 14 may acquire a dance motion previously performed by the avatar, that is, dance motion data previously generated by the apparatus for generating a dancing avatar, as seed motion data (x).

The motion acquisition module 14 may acquire seed motion data (x) by setting random or pre-designated dance motion data as the initial value of the avatar's dance motion data when generating the first dance. In some cases, the user may directly input seed motion data (x) into the motion acquisition module 14, in which case the user may input 3D motion data obtained by filming the dance motion of oneself or another person as seed motion data (x). In addition, 3D dance motion data extracted from various 2D or 3D dance videos using artificial neural networks, etc. can be input as seed motion data (x). The artificial neural network for acquiring 3D motion data from 2D images is publicly available, so it can also be used.

Here, the seed motion data (x) is data containing several joint positions of a person in three dimensions according to a dance motion, and may be, for example, 3D motion data consisting of 72 joint position vectors for each viewpoint.

The music acquisition module 14 acquires music data (y) with which the avatar must perform a dance motion. The music data (y) can be provided by a server of an online service system that provides an avatar service, or the user can directly select and input the music data (y).

The motion acquisition module 14 and the music acquisition module 14 may respectively acquire seed motion data (x) and music data (y) of a specified time length, or may cut the acquired seed motion data (x) and music data (y) by a specified length of time and transmit them to the motion conversion module 16 and the music conversion module 17.

The motion conversion module 16 and the music conversion module 17 receive seed motion data (x) and music data (y) acquired by the motion acquisition module 14 and the music acquisition module 14, respectively, and convert the received seed motion data (x) and music data (y) into data that the transformer decoder 18 can easily process.

The motion conversion module 16 and the music conversion module 17 may obtain motion vectors and music vectors by linearly projecting seed motion data (x) and music data (y) acquired in different data formats into the same virtual feature vector space. Here, the motion vector and the music vector may each be 512-dimensional vectors, for example.

The transformer decoder 18 receives motion vectors and music vectors and generates dance vectors by performing neural network operations. Here, the transformer decoder 18 generates dance vectors appropriate for the motion vectors and music vectors by estimating them through neural network operations according to the trained method, and in particular, it may use the applied genre-specific style code ($s_j$) as a guide to generate dance vectors according to the selected dance genre.

The transformer decoder 18 may generate a dance vector by paying attention to some of the features of the motion vectors and the music vectors according to the applied genre-specific style code ($s_j$) and decoding them so that the corresponding features stand out.

That is, the transformer decoder 18 may estimate the information to focus on in the motion vectors and the music vectors according to the genre-specific style code ($s_j$) in which the dance genre is specified, and decode, paying more attention to the estimated information than the rest of the information contained in the motion vectors and music vectors, thereby obtaining dance vectors for the dance genre designated by the genre-specific style code ($s_j$).

Accordingly, the transformer decoder 18 can output different dance vectors if the genre-specific style code ($s_j$) changes even if the same motion vector and music vector are applied. Here, if the genre-specific style code ($s_i$) for another dance genre is applied, a dance vector representing the changed motion of the other dance genre can be output.

However, if only the value of the genre-specific style code ($s_j$) for the same dance genre changes due to a change in the latent code (z), a dance vector representing a different motion can be output while maintaining the dance genre. In addition, even if the genre-specific style code ($s_j$) does not change, if one or more of the motion vector and the music vector are changed, that is, if the seed motion data (x) and the music data (y) are changed, a dance vector representing motion according to the corresponding genre can be output.

Here, the transformer decoder 18 is known to be specialized for natural language processing or image resolution conversion, and is part of a transformer neural network consisting of a transformer encoder and a transformer decoder. Transformer neural networks are more difficult to perform neural network operations over long time periods compared to LSTM (Long Short-Term Memory), but have the advantage of being able to quickly produce required results with very good performance, making them suitable for systems that require real-time, such as online services. The configuration and operation of the transformer decoder 18 are known technologies and thus will not be described in detail here.

Here, the input module and the transformer decoder 18 may be combined to be referred to as a decoding module.

The output module receives the dance vector generated by the transformer decoder 18, converts it into the avatar's dance motion data ($\tilde{x}=\{\tilde{x}_{m+1}, \tilde{x}_{m+2}, \ldots, \tilde{x}_m'\}$), applies it to the avatar, and outputs it.

The output module may include a dance conversion module 19 and an avatar application module 20. The dance conversion module 19 receives the dance vector generated by the transformer decoder 18 and converts it into dance data ($\tilde{x}$), which is motion data applicable to the avatar.

In contrast to the motion conversion module 16, which linearly projects the seed motion data (x) into a virtual feature vector space, the dance conversion module 19 can inversely linearly project the dance vector obtained as information on the virtual feature vector space and convert it into dance data ($\tilde{x}$), which is 3D motion data representing multiple joint positions.

The avatar application module 20 may receive the dance data ($\tilde{x}$) obtained from the dance conversion module 19 and applies the user's avatar skin based on the position of each joint in the dance data ($\tilde{x}$), thereby outputting a dancing avatar that performs a dance motion suitable for music data.

Figure 3A:
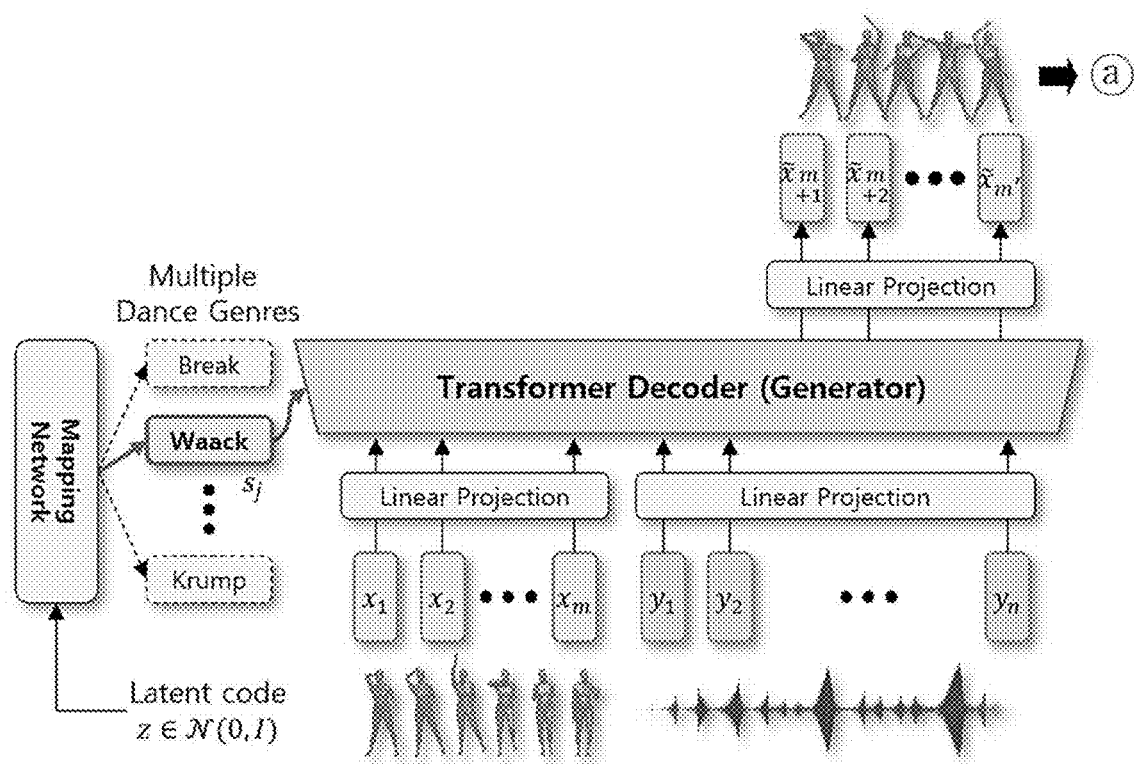
FIGS. 3A and 3B are diagrams for explaining a process in which the apparatus for generating a dancing avatar continuously generates avatars with various dance movements.
Figure 3B:
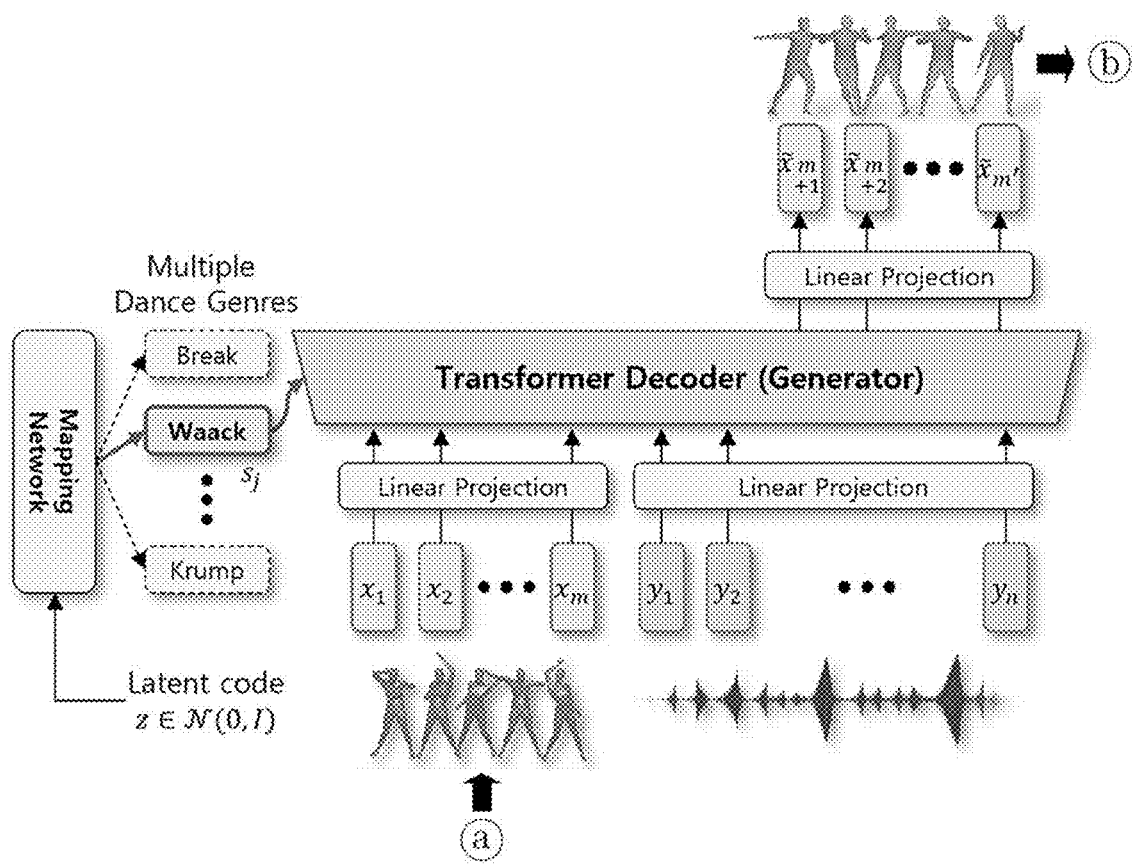

FIGS. 3A and 3B are diagrams for explaining a process in which the apparatus for generating a dancing avatar continuously generates avatars with various dance movements.

In the case of the apparatus for generating an avatar described above, there is a limit to the length of the dance vector that the transformer decoder 18 can generate in one decoding operation. In addition, changes in style code ($s_j$), changes in music data (y) and the like due to changes in selected dance genre, latent code (z) or the like must be immediately reflected in the avatar's dance motion, so it is not desirable for the transformer decoder 18 to generate a dance vector for a long time period (for example, 1 minute) through a single decoding operation. Therefore, the apparatus for generating a dancing avatar of the embodiment represents a method for generating a dancing avatar of an avatar that is continuous over a long time period, while being configured to generate dance vectors for a short time period (for example, within 10 seconds) so that it can respond immediately to changes in dance genre, changes in music data or the like.

FIGS. 3A and 3B are the same apparatus for generating a dancing avatar shown in FIG. 2, but were repeatedly arranged according to changes in time.

As shown in FIG. 3A, at the beginning of operation, the apparatus for generating a dancing avatar may receive randomly generated latent code (z), seed motion data (x), and music data (y), generates dance data ($\tilde{x}$), and outputs it as ⓐ. Then, the apparatus for generating a dancing avatar receives previously generated dance data ($\tilde{x}$) as seed motion data (x), as shown in ⓐ in FIG. 3B, receives updated music data (y) according to changes in time, generates dance data ($\tilde{x}$) again, and outputs it as ⓑ, and then the apparatus for generating a dancing avatar receives the dance data ($\tilde{x}$) of ⓑ as seed motion data (x). That is, FIGS. 3A and 3B show a process in which previously output dance data ($\tilde{x}$) is later re-input as seed motion data (x) in a single apparatus for generating a dancing avatar.

Here, the latent code (z) may be regenerated or a different dance genre from the previous one may be selected and the genre-specific style code ($s_j$) may also be changed and entered, but the genre-specific style code ($s_j$) may not be changed.

Even when the genre-specific style code ($s_j$) is not changed, the apparatus for generating a dancing avatar according to the embodiment can not only generate and output dance data ($\tilde{x}$) that is different from the previous one according to the updated music data (y), but also receives previously generated dance data ($\tilde{x}$) as seed motion data (x) to generate the next dance data ($\tilde{x}$), thereby ensuring that the dance data ($\tilde{x}$) is consistent while being generated with different dance motions of the avatar. This allows the avatar to perform naturally connected dance motions even if the apparatus for generating a dancing avatar continuously and repeatedly generates dance data ($\tilde{x}$). In addition, the apparatus for generating a dancing avatar according to the embodiment can perform non-repeated dance motions because even if the same music data (y) is input repeatedly, the style code ($s_j$) changes depending on the changing latent code (z) or the selected dance genre, and the input seed motion data (x) is also changed by the previously generated dance data ($\tilde{x}$).

Figure 4:
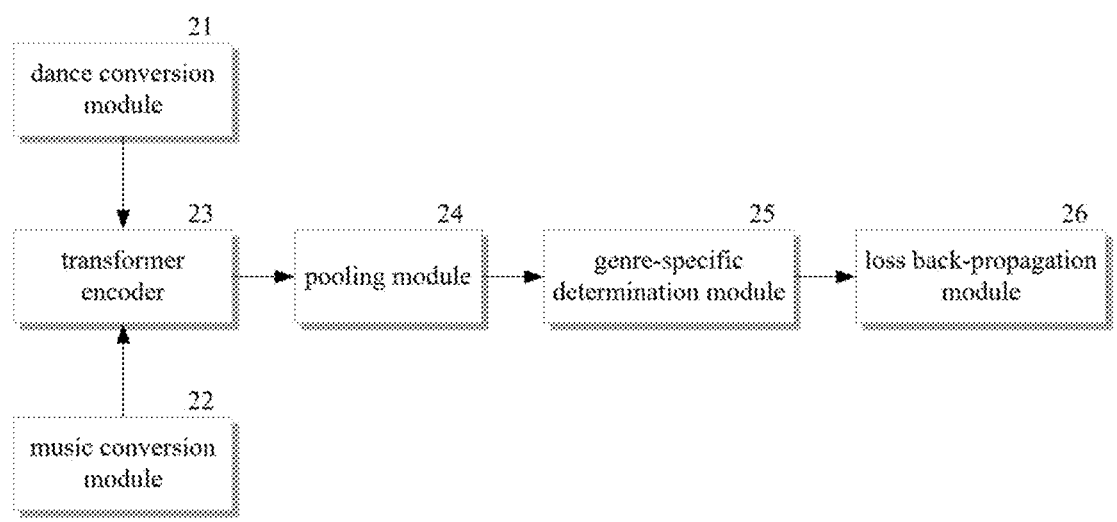
FIG. 4 shows an example of additional components for training the apparatus for generating a dancing avatar of FIG. 1.
Figure 5:
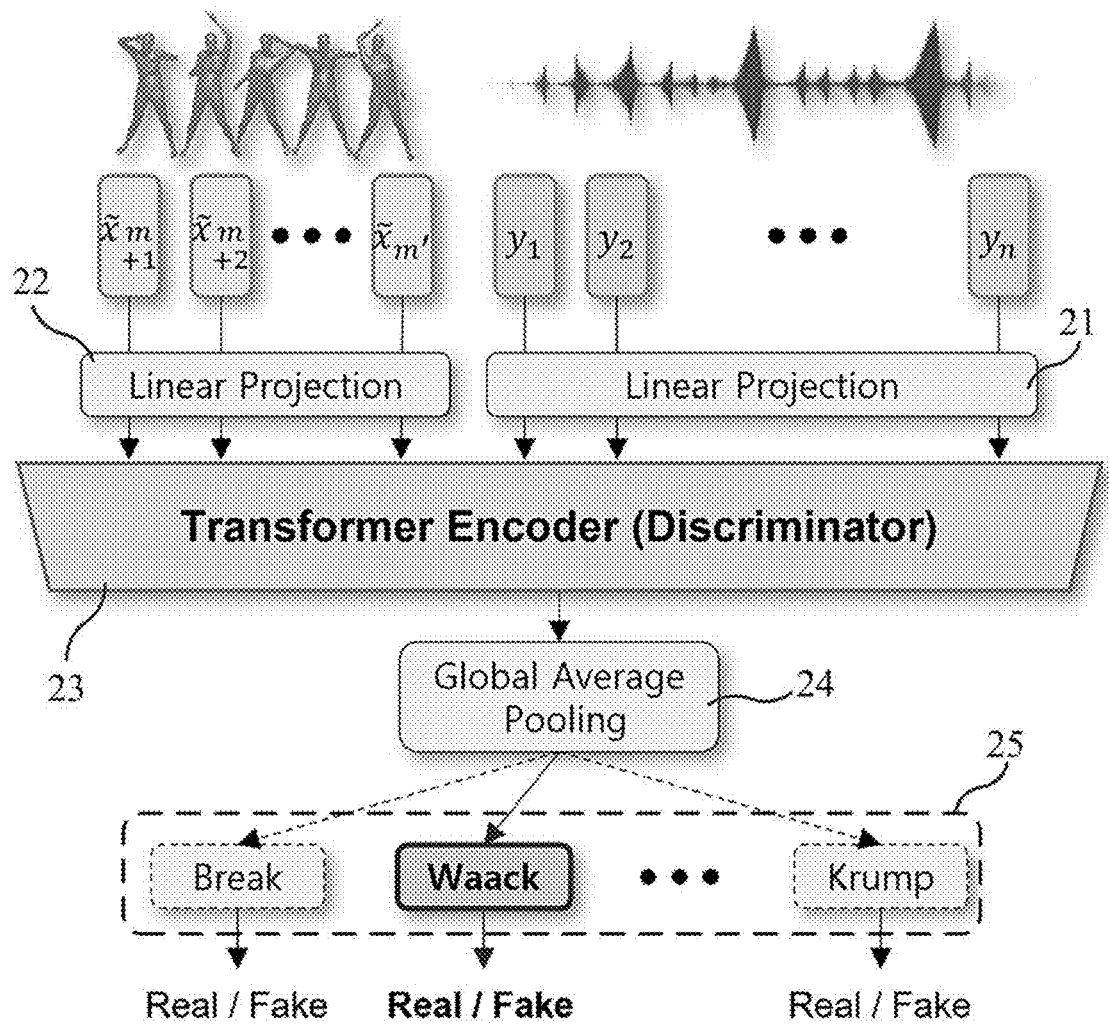
FIG. 5 is a diagram for explaining the operation of each additional component of FIG. 4.

FIG. 4 shows an example of additional components for training the apparatus for generating a dancing avatar of FIG. 1, and FIG. 5 is a diagram for explaining the operation of each additional component of FIG. 4.

In the above-described apparatus for generating a dancing avatar, the mapping network 12 and the transformer decoder 18 may be implemented with an artificial neural network. In addition, when the genre selection module 13 is configured to adaptively select a dance genre to music data (y), the genre selection module 13 may also be implemented with an artificial neural network. In addition, the motion conversion module 16, music conversion module 17, and dance conversion module 19 may also be implemented with an artificial neural network.

Therefore, the apparatus for generating a dancing avatar must be trained in advance before being operated, and FIG. 4 shows the configuration of a training module that is additionally provided when training the apparatus for generating a dancing avatar.

Referring to FIG. 4, the training module may include a training conversion module, a transformer encoder 23, a pooling module 24, a genre-specific determination module 25, and a loss backpropagation module 26.

The training conversion module receives the dance data ($\tilde{x}$) obtained from the dance conversion module 19 together with the music data previously obtained for training and converts them into data suitable for the transformer encoder 23, respectively.

The training conversion module may include a dance conversion module 21 and a music conversion module 22. The dance conversion module 21 receives dance data (x̃) from the dance conversion module 19 and converts it into a motion vector by linearly projecting it into a virtual feature vector space. That is, the dance conversion module 21 converts dance data (x̃) into a motion vector in the same way as the motion conversion module 16. Here, the dance conversion module 21 can be viewed as a configuration for converting the obtained dance data (x̃) back into a motion vector by inversely linearly converting the dance vector output from the transformer decoder 18 by the dance conversion module 19 of the output module. Therefore, the dance vector output from the transformer decoder 18 may be configured to be directly input to the transformer encoder 23, and in this case, the dance conversion module 21 may be omitted.

In addition, the music conversion module 22 receives music data (y) input to the music conversion module 17 of the input module and, in the same way as the music conversion module 17, linearly projects the received music data into the feature vector space to obtain a music vector and inputs it to the transformer encoder 23. However, since the music conversion module 22 performs the same operation as the music conversion module 17 of the input module, when the music vector obtained from the music conversion module 17 of the input module is configured to be directly input to the transformer encoder 23, the music conversion module 22 may be omitted.

The transformer encoder 23 receives dance vectors and music vectors, encodes the received motion vectors and motion vectors, and outputs a feature map. Here, the transformer encoder 23 can be implemented as an artificial neural network, and is a component that forms the transformer neural network together with the transformer decoder 18. The configuration and operation of the transformer encoder 23 are known technologies, and thus will not be described in detail here.

When a feature map is output from the transformer encoder 23, the pooling module 24 obtains a genre score by pooling the feature map. For example, the pooling module 24 may obtain a genre score by performing global average pooling on the feature map.

Meanwhile, the genre-specific determination module 25 receives the genre score and determines whether the received genre score is true or fake for each of the plurality of dance genres. In other words, it determines which dance genre the dance data (x̃) (or dance vector) corresponds to among the plurality of dance genres.

At this time, the dance genre has already been selected in the genre selection module 13, so if the apparatus for generating a dancing avatar has completed training normally, the genre-specific determination module 25 must be judged as real only in the selected dance genre among the plurality of dance genres, and judged as fake in the remaining dance genres. If it is determined to be fake in the selected dance genre, or even if it is determined to be real in the selected dance genre, if it is also determined to be real in at least one other dance genre, it may be considered that the training of the apparatus for generating a dancing avatar has not been completed.

In the embodiment, the transformer decoder 18 can be viewed as a generator, and the transformer encoder 23 can be viewed as a discriminator, so the apparatus for generating a dancing avatar according to the embodiment constitutes a generative adversarial network (hereinafter, GAN).

Accordingly, the loss back-propagation module 26 calculates the loss based on the determination result of the genre-specific determination module 25, and back-propagates the calculated loss to perform training for the apparatus for generating a dancing avatar. The loss back-propagation module 26 may first calculate a loss based on the difference between the determined dance genre and the selected dance genre and perform training by back-propagating the calculated loss. Accordingly, the loss back-propagation module 26 can calculate the original loss ($L_{ori}$) according to Equation 1 according to the GAN configuration.

$$L_{ori}=\mathbb{E}_x[\log D_j(x_{j,m+1:m},y)]+\mathbb{E}_{x,z}[\log(1-D_j(G(x_j,y,s_j),y))] \quad \text{[Equation 1]}$$

In Equation 1, $D_j(x_{j,m+1:m},y)$ refers to the dance genre determination result based on the training dance data ($x_j$) and music data (y) obtained for training in each genre (j), and $D_j(G(x_j, y, s_j), y)$ refers to the dance genre determination result based on dance data (x̃) generated by seed motion data ($x_j$), music data (y), and genre-specific style code ($s_j$) reflecting the dance genre.

In addition, in the apparatus for generating a dancing avatar of the embodiment, the dance genre can be changed, and it must not be determined to be real in dance genres other than the selected dance genre. Accordingly, the loss back-propagation module 26 can calculate the style focus loss ($L_{sty}$) according to whether the generated dance data (x̃) corresponds only to the selected dance genre, according to Equation 2.

$$L_{sty}=\mathbb{E}_{x,z}[\log D_j(G(x_j,y,s_i)),y+\log(1-D_i(G(x_j,y,s_i),y))] \quad \text{[Equation 2]}$$

According to Equation 2, the style focus loss ($L_{sty}$) refers to the loss for training so that the genre determination result for the dance data (x̃) generated by applying the genre-specific style code ($s_i$) according to the selected dance genre (i) together with the seed motion data ($x_j$) for the dance genre (j) is determined as real only for the selected dance genre (i) and fake for other dance genres (j).

The loss back-propagation module 26 may calculate the sum of the original loss ($L_{ori}$) and the style focus loss ($L_{sty}$) as a total loss and back-propagate it, thereby training the apparatus for generating a dancing avatar of the embodiment. Additionally, in order to train similarities between seed motion data (x) and dance data (x̃) according to genre characteristics within the same dance genre, the loss back-propagation module 26 may also calculate the total loss by further reflecting a dance genre-specific loss calculated with an $L_2$-norm function between seed motion data (x) and dance data (x̃) and a style diversity loss that maximizes the L2 loss between generated dance data (x̃) so that even within the same dance genre, diverse dance data (x̃) is generated according to changes in latent code (z), and back-propagate the calculated total loss.

As a result, the apparatus for generating a dancing avatar according to the embodiment obtains a rate code (z) that changes variously and a style code ($s_j$) that changes according to the selected dance genre, and generates dance data (x̃) using seed motion data (x) representing the avatar's previous dance motion and style code ($s_j$) obtained for music data (y) as a guide. Accordingly, not only can the avatar perform a variety of dance motions while performing dance motions according to the dance genre selected based on the changing style code ($s_j$), but also receives seed motion data (x) as input along with music data (y), allowing the avatar to perform dance motions that are suitable for the music and are naturally connected to the avatar's previous dance motions.

In the illustrated embodiment, respective configurations may have different functions and capabilities in addition to those described below, and may include additional configurations in addition to those described below. In addition, in an embodiment, each configuration may be implemented using one or more physically separated devices, or may be implemented by one or more processors or a combination of one or more processors and software, and may not be clearly distinguished in specific operations unlike the illustrated example.

In addition, the apparatus for generating a dancing avatar shown in FIG. 1 may be implemented in a logic circuit by hardware, firm ware, software, or a combination thereof or may be implemented using a general purpose or special purpose computer. The apparatus may be implemented using hardwired device, field programmable gate array (FPGA) or application specific integrated circuit (ASIC). Further, the apparatus may be implemented by a system on chip (SoC) including one or more processors and a controller.

In addition, the apparatus for generating a dancing avatar may be mounted in a computing device or server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

Figure 6:
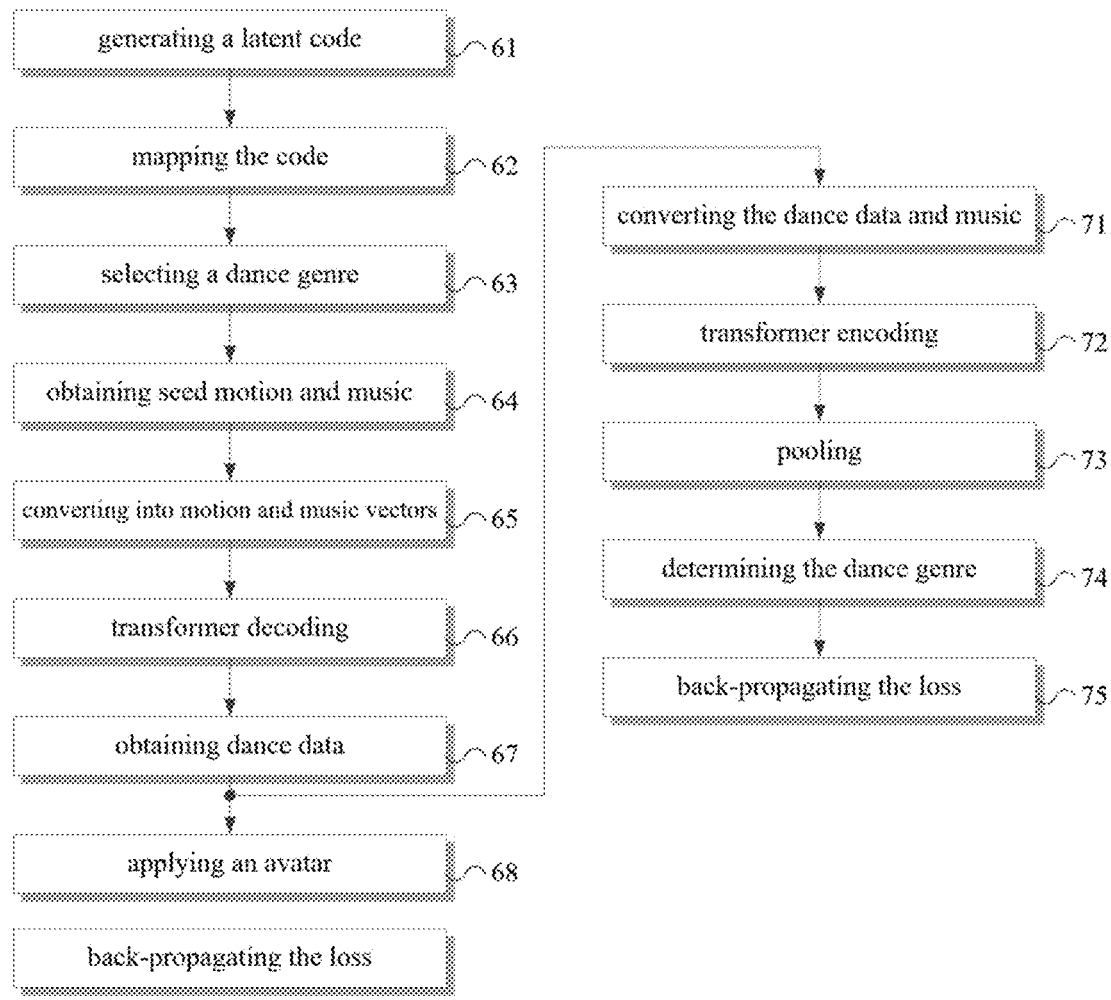
FIG. 6 shows a method for generating a dancing avatar according to an embodiment.

FIG. 6 shows a method for generating a dancing avatar according to an embodiment.

Referring to FIG. 1 to FIG. 5, the method for generating a dancing avatar of FIG. 6 is described as follows. First, a latent code (z) is generated (61). The latent code (z) is a variable for diversifying the dance motion of the generated avatar and can be generated in various ways. For example, it can be generated as a random code vector based on Gaussian noise distribution.

Then, a neural network operation is performed on the generated latent code (z), and the latent code (z) is mapped to a style space divided into different areas according to the dance genre, thereby generating a style code (s={$s_1, s_2, \ldots s_J$}) (62). The style code (s) includes a plurality of genre-specific style codes ($s_j$) that are mapped to areas divided according to the dance genre and have different values. Then, the dance genre (j) that the avatar should dance is selected, and a genre-specific style code ($s_j$) according to the selected dance genre (j) is obtained (63). Here, the dance genre (j) is selected by the user, but in some cases, it may be adaptively selected according to the music data (y).

When a dance genre is selected and a genre-specific style code ($s_j$) of the selected dance genre is obtained, seed motion data (x) to be referenced along with music data (y) to which the avatar should dance along are obtained (64). Here, the seed motion data (x) is data to ensure that the avatar's dance motion does not change suddenly and has natural continuity, and may be data about the dance motion that the avatar performs just before. However, initially, no previous dance motion exists, and in this case, the user's dance motion directly captured in 3D or 3D dance motion data extracted from a 2D video may be used as seed motion data (x). In addition, random data may be input as seed motion data (x).

Once the seed motion data (x) and music data (y) are obtained, each of the seed motion data (x) and music data (y) is projected onto a virtual common feature vector space and converted into a motion vector and a music vector (65). Then, using the genre-specific style code ($s_j$) as a guide, the dance vector is obtained by transformer decoding the motion vector and music vector using neural network operation (66). Here, transformer decoding refers to a method of decoding the motion vector and music vector by paying attention to the area designated by the genre-specific style code ($s_j$).

Once the dance vector is obtained, the dance vector obtained on the common feature vector space is inversely linearly converted to obtain dance data ($\tilde{x}$), which is motion data similar to the seed motion data (x) (67). Then, the avatar's skin is applied according to the positions of the joints designated by the obtained dance data ($\tilde{x}$), thereby generating a dancing avatar (68).

Meanwhile, in the apparatus for generating a dancing avatar, neural network operations are performed with an artificial neural network, and the artificial neural network must be trained in advance before being actually used. Even when training an artificial neural network, the steps from step 61 of generating a latent code (z) to step 67 of obtaining dance data are performed in the same manner. Additionally, during training, the obtained dance data ($\tilde{x}$) and the music data input when generating the dance data ($\tilde{x}$) are respectively projected onto a virtual common feature vector space and converted into motion vectors and music vectors (71). Then, a feature map is obtained by transformer encoding the motion vector and music vector using neural network operations (72). Transformer encoding is an encoding operation paired with transformer decoding and can be performed using a transformer encoder and transformer decoder of a transformer network. Since the transformer network is a known technology, the detailed description is omitted here.

In addition, transformer encoding may be directly performed on the music vector obtained in the motion and music vector conversion step 65 and the motion vector output in the transformer decoding step, and in this case, the dance data and music conversion step 71 may be omitted.

Once the feature map is obtained, the obtained feature map is pooled to obtain a genre score (73). As an example, a genre score can be obtained by performing global average pooling on the feature map. Then, the dance genre of the dance data ($\tilde{x}$) is determined according to the obtained genre score (74). Here, it is possible to determine whether each dance genre is real or fake by analyzing whether the genre score corresponds to each of the plurality of dance genres. However, since the selected dance genre is already known, to shorten the training time, it is possible to determine only whether the genre score corresponds to the selected dance genre.

Afterwards, based on the difference between the determined dance genre and the selected dance genre, the loss can be calculated and the calculated loss back-propagated to train the artificial neural network (75).

Here, training may be performed by simply calculating the original loss ($L_{ori}$) with only the error between the selected dance genre and the determined dance genre, but training may also be performed by additionally calculating the style focus loss ($L_{sty}$) depending on whether dance data ($\tilde{x}$) of the selected dance genre has been obtained even when the genre of the input seed motion data (x) is different. In addition, training may also be performed by calculating the total loss by further reflecting a dance genre-specific loss according to the difference between seed motion data and dance data in each dance genre and a style diversity loss that maximizes the difference between dance data so that a variety of dance motions appear within the same dance genre, and back-propagating the calculated total loss.

Training may be performed repeatedly a pre-determined number of times or until the calculated loss is less than or equal to the designated reference loss.

In FIG. 6, it is described that respective processes are sequentially executed, which is, however, illustrative, and those skilled in the art may apply various modifications and changes by changing the order illustrated in FIG. 6 or performing one or more processes in parallel or adding another process without departing from the essential gist of the exemplary embodiment of the present disclosure.

Figure 7:
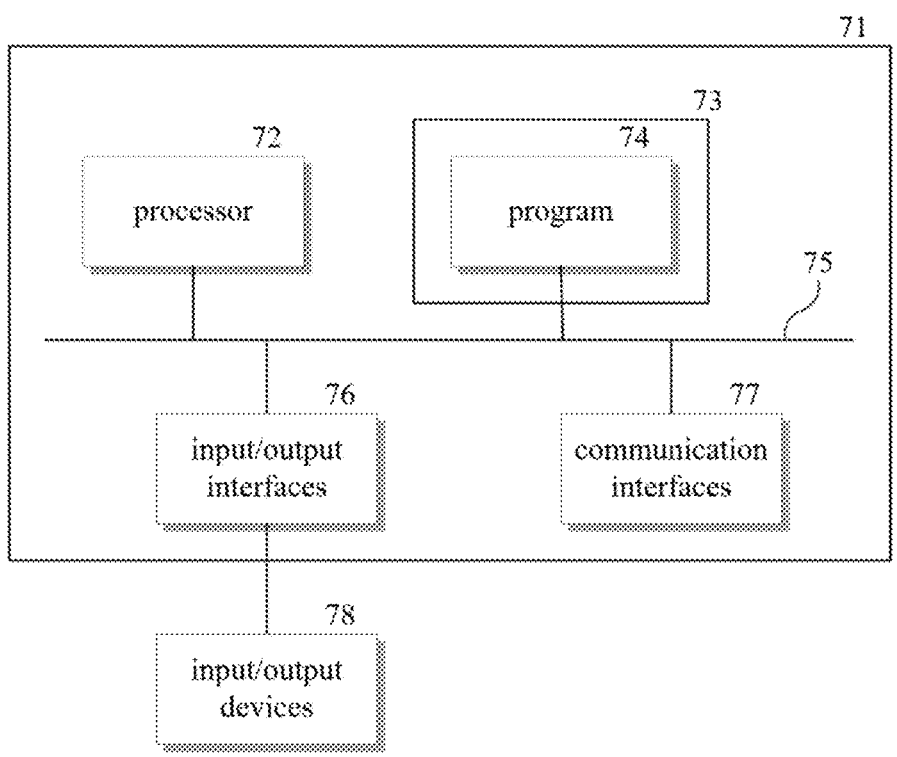
FIG. 7 is a diagram for explaining a computing environment including a computing device according to an embodiment.

FIG. 7 is a diagram for explaining a computing environment including a computing device according to an embodiment.

In the illustrated embodiment, respective configurations may have different functions and capabilities in addition to those described below, and may include additional configurations in addition to those described below. The illustrated computing environment 70 includes a computing device 71. In an embodiment, the computing device 71 may be one or more components included in the apparatus for generating a dancing avatar shown in FIGS. 1 to 5.

The computing device 71 includes at least one processor 72, a computer readable storage medium 73 and a communication bus 75. The processor 72 may cause the computing device 71 to operate according to the above-mentioned exemplary embodiment. For example, the processor 72 may execute one or more programs 74 stored in the computer readable storage medium 73. The one or more programs 74 may include one or more computer executable instructions, and the computer executable instructions may be configured, when executed by the processor 72, to cause the computing device 71 to perform operations in accordance with the exemplary embodiment.

The communication bus 75 interconnects various other components of the computing device 71, including the processor 72 and the computer readable storage medium 73.

The computing device 71 may also include one or more input/output interfaces 76 and one or more communication interfaces 77 that provide interfaces for one or more input/output devices 78. The input/output interfaces 76 and the communication interfaces 77 are connected to the communication bus 75. The input/output devices 78 may be connected to other components of the computing device 71 through the input/output interface 76. Exemplary input/output devices 78 may include input devices such as a pointing device (such as a mouse or trackpad), keyboard, touch input device (such as a touchpad or touchscreen), voice or sound input device, sensor devices of various types and/or photography devices, and/or output devices such as a display device, printer, speaker and/or network card. The exemplary input/output device 78 is one component constituting the computing device 71, may be included inside the computing device 71, or may be connected to the computing device 71 as a separate device distinct from the computing device 71.

Although the present disclosure has been described in detail through representative embodiments above, those skilled in the art will understand that many modifications and other equivalent embodiments can be derived from the embodiments described herein. Therefore, the true technical scope of the present disclosure is to be defined by the technical spirit set forth in the appended scope of claims.

What is claimed is:

1. An apparatus for generating a dancing avatar comprising: one or more processors; and a memory that stores one or more programs executed by the one or more processors, wherein the processors
receive a latent code and map it using a neural network operation to obtain a plurality of genre-specific style codes for each of a plurality of dance genres, and
decode seed motion data and music data, which are motion data that must be referred to when generating an avatar's dance motion, using a genre-specific style code for a dance genre selected among the plurality of genre-specific style codes as a guide, thereby obtaining a dance vector representing a dance motion feature of the avatar in the selected dance genre,
wherein the processors
receive the dance vector, convert it into a format of the motion data to obtain dance data, and
apply an avatar skin to the obtained dance data, thereby generating a dancing avatar,
wherein during training, the processors
receive the dance data and the music data and project them into a virtual common feature vector space to obtain a motion vector and a music vector,
obtain a feature map by transformer encoding the motion vector and the music vector using a neural network operation,
determine the dance genre of the dance data from a genre score obtained by pooling the feature map, and
calculate a loss according to a difference between the determined dance genre and the selected dance genre, and back-propagate it.

2. The apparatus for generating a dancing avatar according to claim 1,
wherein the processors obtain the plurality of genre-specific style codes by mapping the latent code to each area divided according to each of a plurality of dance genres in a virtual style space.

3. The apparatus for generating a dancing avatar according to claim 1,
wherein the processors randomly and repeatedly generate the latent code.

4. The apparatus for generating a dancing avatar according to claim 1,
wherein the processors select one dance genre from the plurality of dance genres in response to a user command.

5. The apparatus for generating a dancing avatar according to claim 1,
wherein the processors
project each of the seed motion data and the music data into a virtual common feature vector space to obtain a motion vector and a music vector, and
decode the obtained motion vector and the music vector using a transformer decoder so that features designated by the selected genre-specific style code stand out, thereby obtaining the dance vector.

6. The apparatus for generating a dancing avatar according to claim 1,
wherein the processors obtain previously obtained dance data as the seed motion data.

7. The apparatus for generating a dancing avatar according to claim 1,
wherein the processors obtain a random value, capture data obtained by capturing user's motions, and 3D dance motion data extracted from a 2D or 3D dance video as an initial value of the seed motion data.

8. The apparatus for generating a dancing avatar according to claim 1,
wherein the processors calculate
a style focus loss according to the difference between the dance genre of the seed motion data and the determined dance genre, and
when the dance genre of the seed motion data and the selected dance genre are the same, a dance genre-specific loss calculated as the difference between the seed motion data and the dance data, and
a style diversity loss that maximizes the difference between dance data by obtaining dance data previously obtained from the same selected dance genre as the seed motion data, so that repeatedly generated dance data represents various motions,
and further apply them to the loss.

9. A method for generating a dancing avatar, performed by a computing device having one or more processors and a memory storing one or more programs executed by the one or more processors, comprising the steps of:
receiving a latent code and mapping it using a neural network operation to obtain a plurality of genre-specific style codes for each of a plurality of dance genres; and
decoding seed motion data and music data that must be referred to when generating an avatar's dance motion, using a genre-specific style code for a dance genre selected among the plurality of genre-specific style codes as a guide, thereby obtaining a dance vector representing a dance motion feature of the avatar in the selected dance genre,
wherein the method further includes the steps of
receiving the dance vector, converting it into a format of the motion data to obtain dance data, and applying an avatar skin to the obtained dance data, thereby generating a dancing avatar, and
during training, receiving the dance data and the music data and projecting them into a virtual common feature vector space to obtain a motion vector and a music vector, obtaining a feature map by transformer encoding the motion vector and the music vector using a neural network operation, determining the dance genre of the dance data from a genre score obtained by pooling the feature map, and calculating a loss according to a difference between the determined dance genre and the selected dance genre, and back-propagating it.

10. The method for generating a dancing avatar according to claim 9,
wherein the step of obtaining the style codes includes
obtaining the plurality of genre-specific style codes by mapping the latent code to each area divided according to each of a plurality of dance genres in a virtual style space.

11. The method for generating a dancing avatar according to claim 9,
wherein the step of obtaining the style codes includes
randomly and repeatedly generating the latent code.

12. The method for generating a dancing avatar according to claim 9,
wherein the step of obtaining the style codes includes
selecting one dance genre from the plurality of dance genres in response to a user command.

13. The method for generating a dancing avatar according to claim 9,
wherein the step of obtaining a dance vector includes
projecting each of the seed motion data and the music data into a virtual common feature vector space to obtain a motion vector and a music vector, and
decoding the obtained motion vector and the music vector using a transformer decoder so that features designated by the selected genre-specific style code stand out, thereby obtaining the dance vector.

14. The method for generating a dancing avatar according to claim 9,
wherein the step of obtaining a dance vector includes
obtaining previously obtained dance data as the seed motion data.

15. The method for generating a dancing avatar according to claim 9,
wherein the step of obtaining the feature vector includes
obtaining a random value, capture data obtained by capturing user's motions, and 3D dance motion data extracted from a 2D or 3D dance video as an initial value of the seed motion data.

16. The method for generating a dancing avatar according to claim 9,
wherein the step of propagating includes calculating
a style focus loss according to the difference between the dance genre of the seed motion data and the determined dance genre, and
when the dance genre of the seed motion data and the selected dance genre are the same, a dance genre-specific loss calculated as the difference between the seed motion data and the dance data, and
a style diversity loss that maximizes the difference between dance data by obtaining dance data previously obtained from the same selected dance genre as the seed motion data, so that repeatedly generated dance data represents various motions,
and back-propagating by adding them to the loss.

* * * * *